US008572048B2

(12) United States Patent
LaBerge (10) Patent No.: US 8,572,048 B2
(45) Date of Patent: Oct. 29, 2013

(54) SUPPORTING INTERNAL CONSISTENCY CHECKING WITH CONSISTENCY CODED JOURNAL FILE ENTRIES

(76) Inventor: Tim LaBerge, Saint Paul, MN (US)

( * ) Notice: Subject to any disclaimer, the term of this patent is extended or adjusted under 35 U.S.C. 154(b) by 790 days.

(21) Appl. No.: 12/615,539

(22) Filed: Nov. 10, 2009

(65) Prior Publication Data

US 2011/0113017 A1     May 12, 2011

(51) Int. Cl.
*G06F 17/30*     (2006.01)

(52) U.S. Cl.
USPC ............................................. 707/684

(58) Field of Classification Search
USPC ......... 707/707, 706, 647, 649, 682, 684, 685, 707/690, 677, 678
See application file for complete search history.

(56) References Cited

U.S. PATENT DOCUMENTS

| 5,963,962 | A  | * | 10/1999 | Hitz et al. ............................ | 1/1 |
| 6,874,001 | B2 | * | 3/2005  | Narang et al. ........................ | 1/1 |
| 7,752,180 | B1 | * | 7/2010  | Fair et al. ......................... | 707/690 |
| 7,831,789 | B1 | * | 11/2010 | Per et al. .......................... | 711/162 |
| 7,987,156 | B1 | * | 7/2011  | Chatterjee et al. ............. | 707/638 |
| 8,260,744 | B1 | * | 9/2012  | Chatterjee et al. ............. | 707/639 |
| 8,335,775 | B1 | * | 12/2012 | Sedlar et al. ................... | 707/695 |
| 2008/0189343 | A1 | * | 8/2008 | Hyer et al. ..................... | 707/205 |

* cited by examiner

*Primary Examiner* — Anteneh Girma
*Assistant Examiner* — Fatima Mina (57) ABSTRACT

Example systems, methods, and apparatus economize generating and processing incremental journal files while maintaining internal consistency. One example method determines whether a sequence number associated with a first inode description in a disaster recovery (DR) journal entry is out of sequence with a second corresponding inode description in a DR metadump. The example method controls a DR journal process to provide a file system inconsistency signal and to suspend application of the DR journal entry to the DR metadump. The suspending and signaling can occur upon determining that a first access time independent verification code computed from the first inode description does not match a second access time independent verification code computed from the second inode description.

8 Claims, 6 Drawing Sheets

SUPPORTING INTERNAL CONSISTENCY CHECKING WITH CONSISTENCY CODED JOURNAL FILE ENTRIES

BACKGROUND

A file system stores items (e.g., files) on a data storage device(s). The data storage device(s) may be real or virtual. A file system also stores information about the items (e.g., files) that are stored. The information may be referred to as metadata. Metadata can include, for example, file names, file types, file lengths, file update times, file access times, and other information. Metadata may be stored in an information node, which is referred to by one skilled in the art as an inode. Inodes may be implemented as instances of objects.

To avoid catastrophe, a file system may be replicated, backed up, or otherwise protected. One way to protect a file system is to maintain a disaster recovery (DR) architecture. The DR architecture can facilitate recreating the file system, recreating information about the file system, and other actions. However, conventional DR architectures may be burdened with DR journal entries that consume processing time and storage space while providing little, if any, payoff to disaster recovery.

BRIEF DESCRIPTION OF THE DRAWINGS

The accompanying drawings, which are incorporated in and constitute a part of the specification, illustrate various example systems, methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

One example file system disaster recovery (DR) architecture includes a main file and a transaction journal. The main file may be, for example, a metadump that maintains physical data representing an abstract description of metadata associated with the file system. Rather than copying the actual metadata, a more abstract copy that is a representation of the data may be stored in the metadump. Therefore the data in the metadump may be less structured than the actual metadata associated with the file system.

The transaction journal maintains physical data representing abstract representations of incremental changes to the file system. Incremental changes occur because items stored in a file system may not be static. For example, items may be added, deleted, edited, updated, and experience other changes. When a change is made to an item stored by the file system, a journal entry storing physical data representing an abstract representation of the incremental change can be made. For example, rather than store an entire new copy of the changed item, information about how the item was changed may be stored.

The main file may be updated periodically by a process that applies entries from the journal file to the main file. Since the main file and the journal file are intended to facilitate recreating file system metadata after a disaster, processes that apply journal entries to the main file are configured to maintain consistency.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 1:
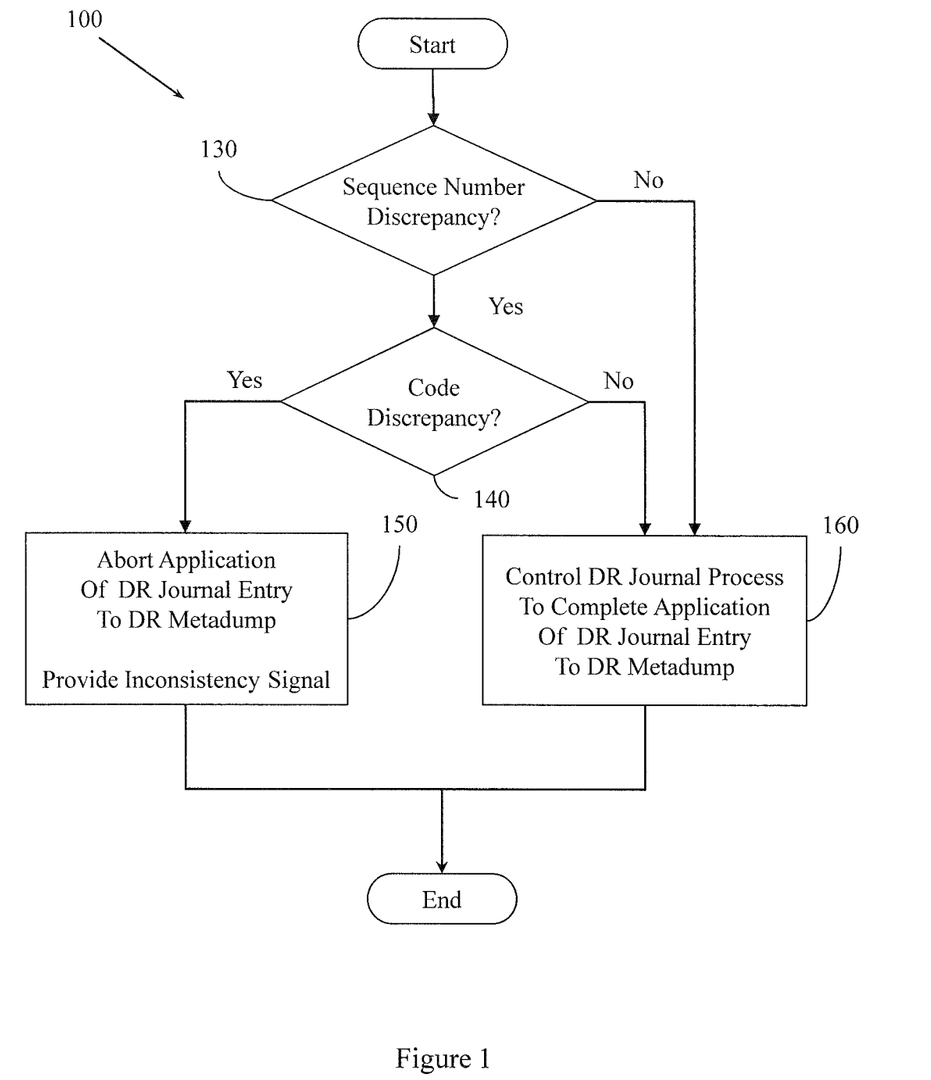
FIG. 1 illustrates an embodiment of a method associated with processing DR journal files that maintain internal consistency checking.

FIG. 1 illustrates a method 100 that is associated with processing DR journal files that maintain internal consistency checking. Consistency checking facilitates improving accuracy in correctness. Detecting file system inconsistency after a disaster would be an undesirable result because no consistent file system would be available for recovery. Therefore, it is desirable to evaluate and report on file system consistency while building DR files.

File system inconsistency can occur if journal entries are applied out of order to the main file. For example, if data was added to a file, then data was removed from a file, then more data was added to a file, applying those three updates in order would facilitate recreating the metadata and thus the file in an accurate consistent state. However, if the updates were applied out of order (e.g., add, add, then remove), neither the metadata (e.g., file length) nor the actual data (e.g., file contents) are likely to be recreated in an accurate and consistent manner. An inaccurate and inconsistent result would occur if data that was added by the second add was inadvertently deleted by the out of sync delete.

Method 100 includes, at 130, controlling a computer to determine whether a sequence number associated with a first inode description in a DR journal entry is out of sequence with a second corresponding inode description in a DR metadump. More generally this can be described as identifying a sequence number discrepancy. In one example, the DR metadump stores data representing an abstract description of file system metadata. The DR metadump may be, for example, a flat file that is stored on a local file system that is separate and distinct from the active file system from which the DR journal process produced the DR metadump. In one example, method 100 determines that the sequence numbers are out of sequence when the sequence numbers are more than one off.

The first inode description can include an abstract description of file system metadata associated with a file system inode. The first inode description can also include an abstract description of an update to a file system entry associated with the file system inode. The second corresponding inode description can include an abstract description of file system metadata associated with the file system. Both inode descriptions include sequence numbers. When a file system item is updated, a sequence number in an inode associated with the file system item is incremented. Therefore, consistency checking is possible by examining sequence numbers in the first inode description and the corresponding second inode description.

If the determination at 130 is that the sequence numbers are out of sequence (e.g., off by more than one), then method 100 continues, at 140, to determine whether a first access time independent verification code computed from the first inode description matches a second access time independent verification code computed from the second inode description. More generally this can be described as determining whether there is a code discrepancy. The first access time independent verification code is computed in a file system transaction associated with updating a file system item. The first access time independent verification code is based on fields in a rollback object accessible to the transaction. The fields from which the access time independent verification code are computed are fields in the rollback object that are not affected by an access time only update. The second access time independent verification code is computed from fields in the second corresponding inode. The fields from which the access time independent verification code is computed are fields in the second corresponding inode that are not affected by an access time only update.

The access time independent verification code can be computed in different ways. In one example, the access time independent verification code is a checksum. In another example, the access time independent verification code is a cryptographic hash. One skilled in the art will appreciate that other access time independent verification codes can be employed.

If the determination at 140 is that there is a match between the access time independent verification codes, then method 100 continues at 160 by controlling the DR journal process to apply the DR journal entry to the DR metadump. If the determination at 140 is that the access time independent verification codes do not match, then method 100 continues at 150 by controlling a DR journal process to provide a file system inconsistency signal and to suspend application of the DR journal entry to the DR metadump.

Method 100 facilitates improving consistency checking for a DR architecture. A DR architecture subjected to method 100 will be free from inconsistencies so long as there is no checksum collision between the DR journal entry checksum and the corresponding metadump entry checksum. Checksum collisions are rare. Sequence number mismatches are also rare. The combination of a checksum collision and a sequence number mismatch is very rare. Therefore method 100 facilitates improving file system consistency in a DR architecture. However, method 100 can be extended to provide more efficient DR journal files and more efficient metadump updates.

Figure 2:
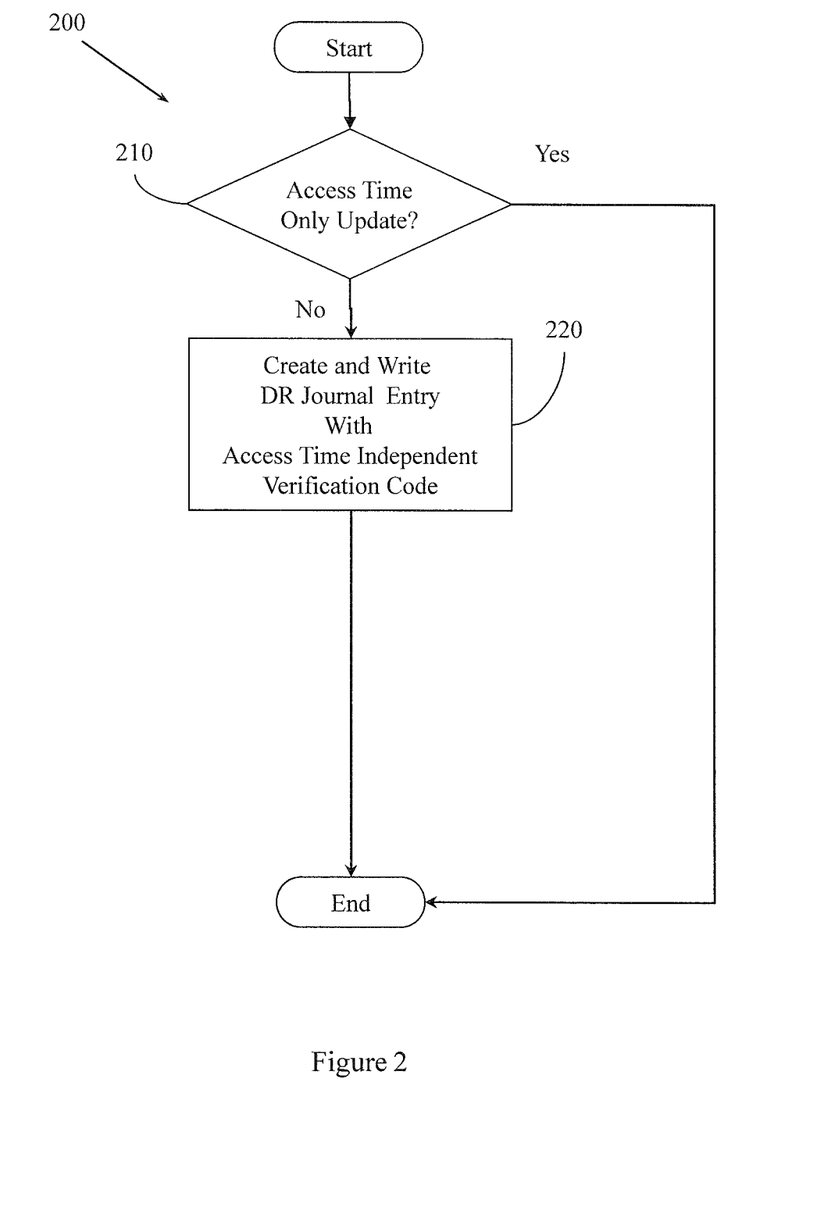
FIG. 2 illustrates an embodiment of a method associated with efficiently producing DR journal file entries that support internal consistency checking using consistency codes.

FIG. 2 illustrates a method 200 associated with efficiently producing DR journal file entries having consistency codes. At 210, a determination is made concerning whether an access of a file system item will only change the access time of the item. For example, a virus checking program may periodically read files without changing the files. Conventionally, a DR journal file entry would be created for each touch of a file, even a read-only touch. This can waste both processing time and storage space. Method 200 will not create a DR journal file entry for an event that will only change the access time for a file system item. So, if the determination at 210 is that only the access time will change, no DR journal file entry is created.

If, however, the determination at 210 is that more than only the access time will change, then method 200 continues to 220. At 220, a DR journal file entry is created and written to a DR journal file. The DR journal file will include an access time independent verification code. The code is computed from fields other than those that would have been affected by an access time only event. The code is computed from a rollback object that is available to a transaction involved in the file system access.

Figure 3:
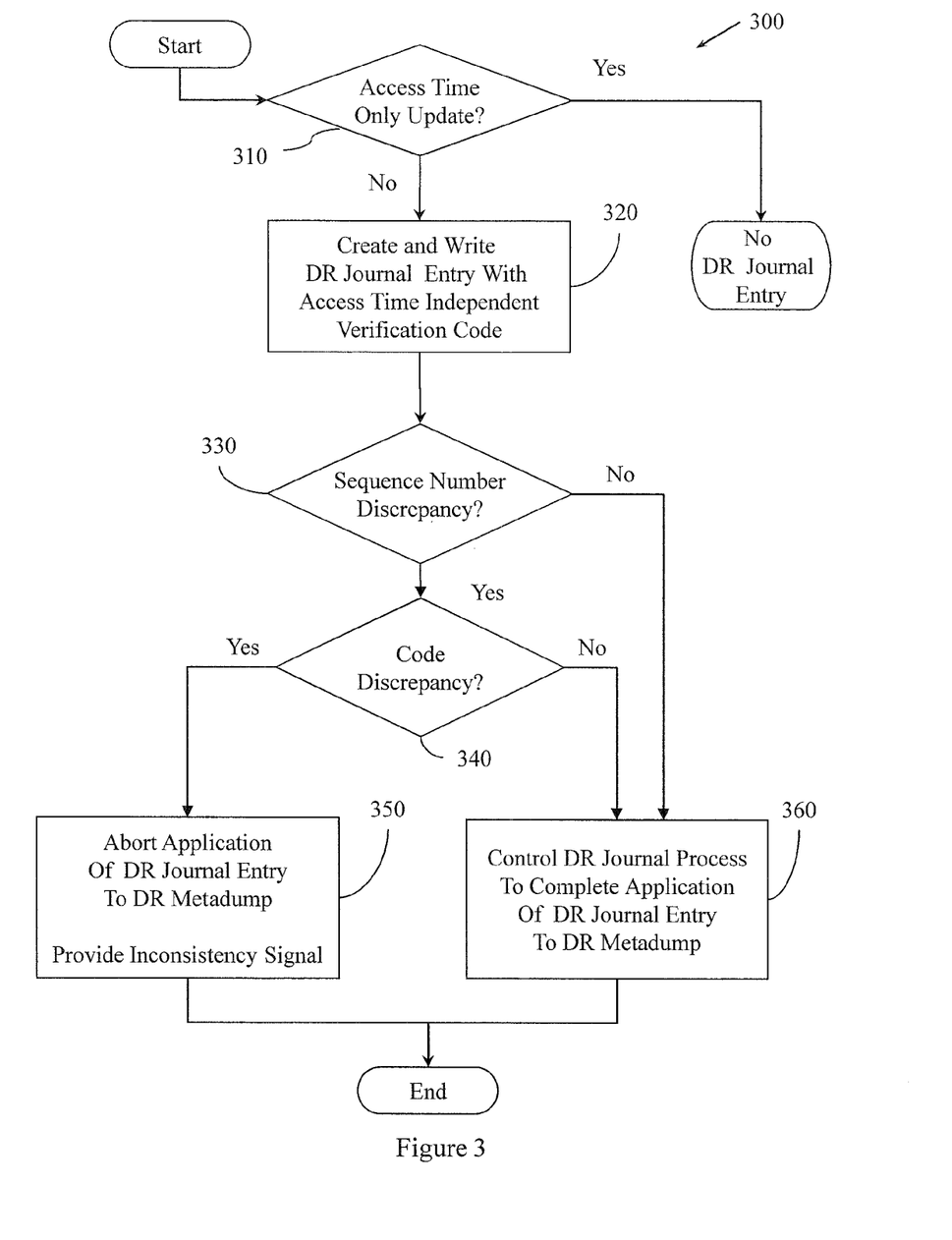
FIG. 3 illustrates an embodiment of a method associated with efficiently generating and processing DR journal file entries that maintain internal consistency checking.

FIG. 3 illustrates a method 300 that combines method 100 and method 200. One skilled in the art will appreciate that actions 310 and 320 can occur one or more times before method 300 proceeds to action 330. One skilled in the art will also appreciate that actions 330 through 360 can occur more than once over a period of time. One skilled in the art will appreciate that a first process may perform actions 310 and 320 to write a DR journal file and that a second process may perform actions 330 through 360 to consume the DR journal file that is written by the first process. Actions 310 and 320 can be filling a DR journal file while actions 330 through 360 can be emptying the DR journal file and updating a metadump. If consistency is lost, method 300 will stop and provide a signal that consistency has been lost. Thus, method 300 improves over conventional systems in at least two ways. First, method 300 produces smaller DR journals that do not include entries that are irrelevant from the point of view of disaster recovery. Second, method 300 checks consistency in an ongoing manner to facilitate maintaining consistency in the DR architecture.

In one example, a method may be implemented as computer executable instructions. Thus, in one example, a computer-readable medium may store computer executable instructions that if executed by a computer (e.g., disaster recovery server) cause the computer to perform method 300. While executable instructions associated with the above method are described as being stored on a computer-readable medium, it is to be appreciated that executable instructions associated with other example methods described herein may also be stored on a computer-readable medium.

Figure 4:
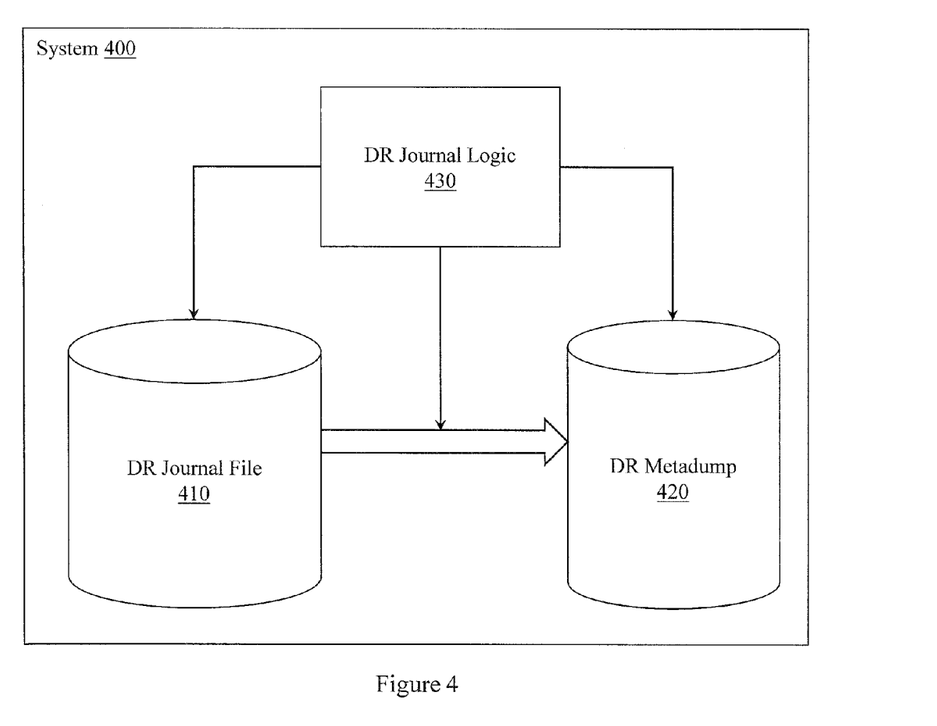
FIG. 4 illustrates a system associated with efficiently processing DR journal files that maintain internal consistency checking.

FIG. 4 illustrates a system 400 associated with efficiently processing DR journal file entries that maintain internal consistency checking. In one embodiment, a DR architecture includes a DR metadump 420 and a DR journal file 410 that are processed by DR journal logic 430. The DR metadump 420 may be, for example, a flat file that stores an abstract description of metadata associated with an active file system. The DR metadump 420 may be stored in a local file system different from the active file system. Logic 430 can be implemented in hardware, firmware, software in execution on a machine, and/or combinations thereof to perform a function (s) or an action(s), and/or to cause a function or action from another logic, method, and/or system. Logic 430 may include, for example, a software controlled microprocessor, a discrete logic (e.g., ASIC (application specific integrated circuit)), an analog circuit, a digital circuit, a programmed logic device, or a memory device containing instructions. Logic 430 may include one or more gates, combinations of gates, or other circuit components.

Figure 5:
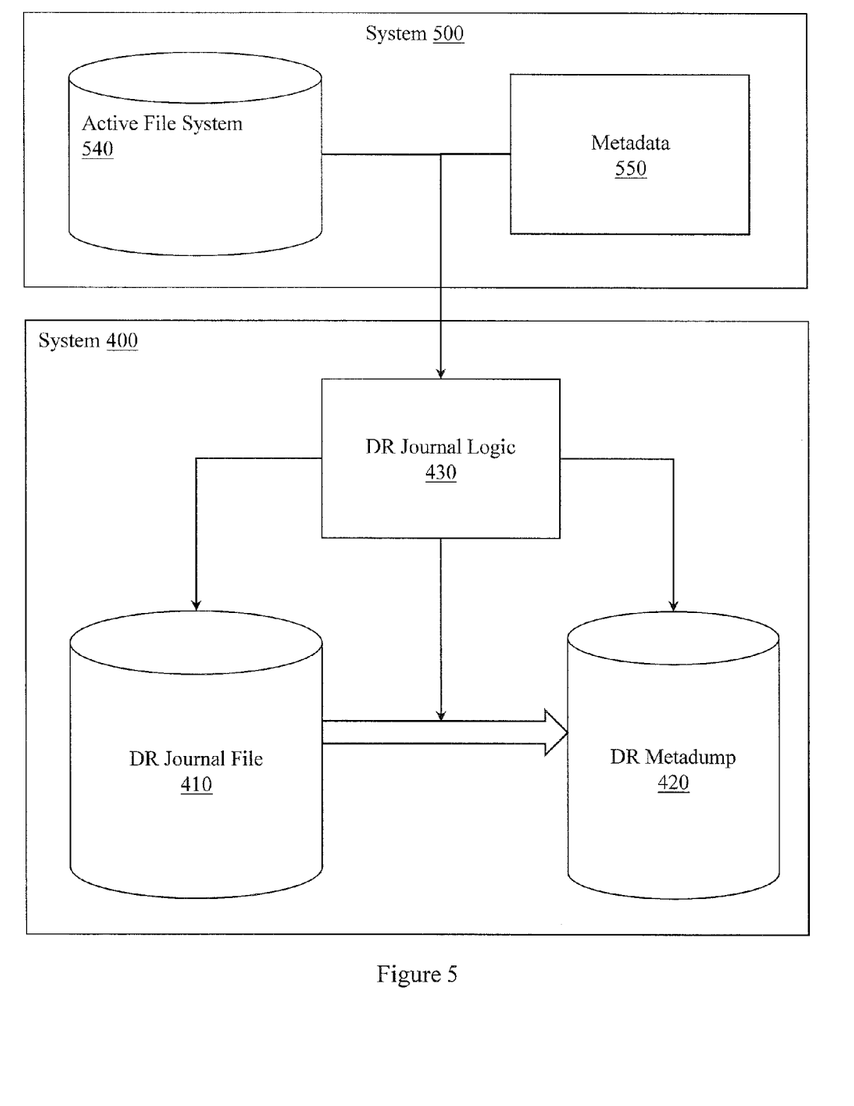
FIG. 5 illustrates a system associated with efficiently generating and processing DR journal files that maintain internal consistency checking.

FIG. 5 illustrates system 400 interacting with a system 500. System 500 includes an active file system 540 and metadata 550 associated with the active file system 540. One skilled in the art appreciates what a file system is and what metadata associated with a file system is.

Logic 430 can create the DR metadump 420 by stopping the active file system 540, scanning metadata 550, and writing an abstract description of the file system metadata 550 to the metadump 420. The metadata 550 can include, for example, file names, file types, and other data about the files stored by the active file system.

Creating metadump 420 can be time-consuming. During the time that the metadump 420 is being created, the active file system 540 may not be available for other purposes. Therefore, rather than creating a complete metadump 420 when a change is made to file system 540, data about incremental changes to the active file system 540 are stored in DR journal file 410. However, records of some incremental changes may not enhance disaster recovery. For example, reading an item in an active file system 540 without changing the item in the file system 540 is uninteresting from the point of view of disaster recovery. However, conventional disaster recovery systems may produce DR journal entries for these uninteresting events. While these conventional DR journal entries facilitate understanding whether update consistency has been maintained, the conventional DR journal entries can consume significant storage resources. Furthermore, applying these conventional DR journal entries to a conventional DR metadump can consume significant computing time and resources, with little if any payoff from the point of view of disaster recovery.

Updates to file system 540 are made in a transaction. The transaction has two copies of an inode available. One copy of the inode is a rollback inode that is not changed in the transaction and that is, therefore, available for rolling back the transaction if the transaction cannot complete. Another copy of the inode is updated by the transaction and, if the transaction can be successfully completed, the updated copy of the inode is applied to the file system. When updating file system 540, a transaction is one hundred percent completed or zero percent completed and thus either all the changes made by a file system update occur or none of the changes made by an attempted file system update occur.

Logic 430 does not produce a DR journal entry for an event that only changes the access time of a file. Logic 430 does produce a DR journal entry for events that do more than just change the access time of a file. For events that do more than just change the access time of a file, logic 430 produces an access time update independent verification code using fields in the rollback object that are not related to access time. The rollback object will correspond to information stored in the DR metadump 420. Therefore, when the DR journal entry is being applied to the metadump 420, if an inconsistency is suspected, the access time update independent verification code in the DR journal entry can be evaluated in light of information stored in the metadump 420. For example, an access time update independent verification code can be computed for a metadump entry and compared to the access time update independent verification code in the DR journal entry. The access time update independent verification code can be, for example, a checksum, a cryptographic hash, and other codes.

Logic 430 uses DR journal file 410 to update the DR metadump 420 to keep the metadump 420 synchronized with the active file system 540. Therefore, the system 400 facilitates quickly restoring metadata 550 associated with the active file system 540 on demand. To prevent compounding a problem, it is desirable to have an accurate and consistent metadump 420. Therefore, DR journal file 410 and entries in DR journal file 410 are subjected to consistency checking before being allowed to update the DR metadump 420.

Logic 430 suppresses uninteresting DR journal entries while preserving consistency checking. Logic 430 facilitates recovering metadata 550 or file system 540 to a point in time associated with a particular entry in the DR journal 410. The DR journal entry can be, for example, the last applied DR journal entry, the last available DR journal entry, or another DR journal entry. Logic 430 applies DR journal entries to metadump 420 in a manner that allows updates to the stored representation of metadata 550 to be made in order while discovering and reporting inconsistencies.

"Computer-readable medium", as used herein, refers to a medium that stores signals, instructions and/or data. A computer-readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer-readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

Figure 6:
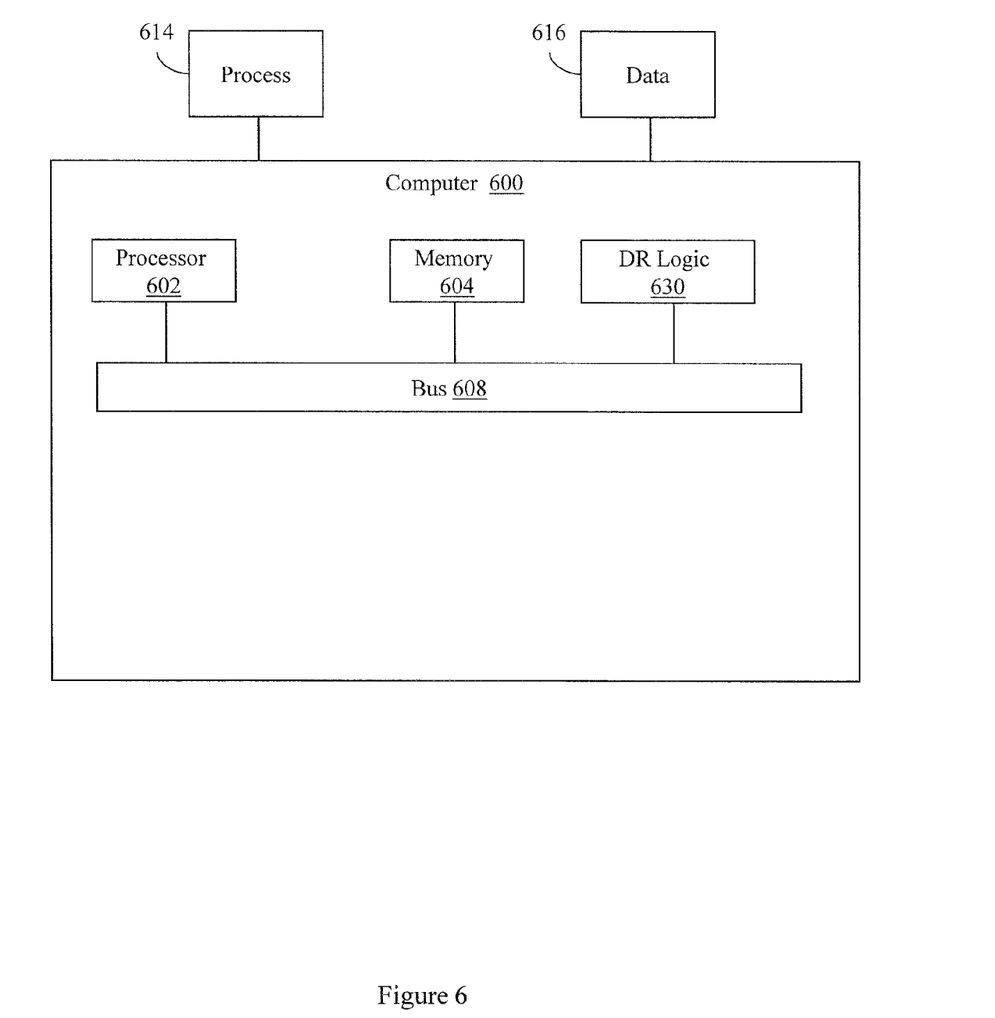
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602 and a memory 604 operably connected by a bus 608. In one example, the computer 600 may include a DR logic 630 configured to facilitate efficiently creating and processing disaster recovery journal file entries while maintaining internal consistency. In different examples, the logic 630 may be implemented in hardware, executing software, firmware, and/or combinations thereof. While the logic 630 is illustrated as a hardware component attached to the bus 608, it is to be appreciated that in one example, the logic 630 could be implemented in the processor 602.

Thus, logic 630 may provide means (e.g., hardware, software in execution, firmware) for controlling a file system transaction component to only write DR journal file entries that are relevant to a disaster recovery process. The relevant DR journal file entries concern file system updates that do more than just change the access time for a file system entity. Logic 630 may also provide means for controlling the file system transaction component to write inode sequence number information and inode consistency information to a DR journal file entry. Logic 630 may also provide means (e.g., hardware, software in execution, firmware) for controlling a disaster recovery incremental update component to report a file system inconsistency error. The error will be reported when a comparison of DR journal file entry information to DR metadump file entry information reveals a sequence number inconsistency and an inode consistency information inconsistency. The means may be implemented, for example, as an ASIC. The means may also be implemented as computer executable instructions that are presented to computer 600 as data 616 that are temporarily stored in memory 604 and then executed by processor 602. When resident in computer 600, logic 630 transforms computer 600 from a general purpose computer into a disaster recovery specific computer.

Generally describing an example configuration of the computer 600, the processor 602 may be a variety of various processors including dual microprocessor and other multiprocessor architectures. A memory 604 may include volatile memory (e.g., RAM (random access memory)) and/or non-volatile memory (e.g., ROM (read only memory)). The memory 604 can store a process 614 and/or a data 616, for example.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE (peripheral component interconnect express), 1394, USB (universal serial bus), Ethernet). The bus 608 can be types including, for example, a memory bus, a memory controller, a peripheral bus, an external bus, a crossbar switch, and/or a local bus.

While example systems, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer control the computer to perform a method, the method comprising:

upon determining that a sequence number associated with a first inode description in a disaster recovery (DR) journal entry is out of sequence with a second corresponding inode description in a DR metadump, where the sequence number associated is incremented when an item associated with the inode is accessed by a file system, controlling a DR journal process to provide a file system inconsistency signal and to suspend application of the DR journal entry to the DR metadump as a function of determining that a first access time independent verification code computed from the first inode description does not match a second access time independent verification code computed from the second inode description; and controlling the DR journal process to complete application of the DR journal entry to the DR metadump as a function of determining that the first access time independent verification code is consistent with the second access time independent verification code, where the first access time independent verification code is computed in a file system transaction and is based on fields in a rollback object accessible to the transaction, where the fields in the rollback object are not affected by an access time only update, and where the second access time independent verification code is computed from fields in the second corresponding mode, where the fields in the second corresponding mode are not affected by an access time only update.

2. The non-transitory computer-readable medium of claim 1, the method including, upon determining that access to a file system entry will only update the access time for an mode associated with the file system entry, controlling the DR journal process to not create a DR journal entry for the access to the file system entry.

3. The non-transitory computer-readable medium of claim 2, the method including, upon determining that the access to the file system entry will update more than just the access time for the mode associated with the file system entry, controlling the DR journal process to create a DR journal entry for the access to the file system entry, where the DR journal entry includes an access time independent verification code.

4. The non-transitory computer-readable medium of claim 1, the first mode description comprising an abstract description of file system metadata associated with a file system mode and an update to a file system entry associated with the file system mode.

5. The non-transitory computer-readable medium of claim 4, the second corresponding mode description comprising an abstract description of file system metadata associated with the file system.

6. The non-transitory computer-readable medium of claim 1, the DR metadump comprising an abstract description of file system metadata.

7. The non-transitory computer-readable medium of claim 1, where the DR journal process is configured to bring the DR metadump up to date with the file system.

8. The non-transitory computer-readable medium of claim 1, where the first access time independent verification code is one of, a checksum, and a cryptographic hash and where the second access time independent verification code is one of, a checksum, and a cryptographic hash.

* * * * *

UNITED STATES PATENT AND TRADEMARK OFFICE
CERTIFICATE OF CORRECTION

PATENT NO. : 8,572,048 B2  
APPLICATION NO. : 12/615539  
DATED : October 29, 2013  
INVENTOR(S) : Tim LaBerge Page 1 of 1

It is certified that error appears in the above-identified patent and that said Letters Patent is hereby corrected as shown below:

In the Claims:

In column 8, line 48, delete "mode" and insert --inode--.

In column 8, line 49, delete "mode" and insert --inode--.

In column 8, line 52, delete "mode" and insert --inode--.

In column 8, line 59, delete "mode" and insert --inode--.

In column 8, line 64, delete "mode" and insert --inode--.

In column 8, line 66, delete "mode" and insert --inode--.

In column 8, line 67, delete "mode" and insert --inode--.

In column 9, line 2, delete "mode" and insert --inode--.

Signed and Sealed this  
Twelfth Day of August, 2014

Michelle K. Lee  
*Deputy Director of the United States Patent and Trademark Office*